May 6, 1941.    A. BOECLER ET AL    2,241,176
APPARATUS FOR PRODUCING HOLLOW ARTICLES BY IMMERSION
Filed July 9, 1938    4 Sheets-Sheet 1

Inventors
Albert Boecler
Kurt Bratring
by Albert G. Davis,
Attorney

Fig. 2

Patented May 6, 1941

2,241,176

UNITED STATES PATENT OFFICE 2,241,176

APPARATUS FOR PRODUCING HOLLOW ARTICLES BY IMMERSION

Albert Boecler, Berlin, and Kurt Bratring, Dahlem, Berlin, Germany, assignors, by mesne assignments, to Neocell Products Corporation, a corporation of Delaware Application July 9, 1938, Serial No. 218,326

7 Claims. (Cl. 18—24)

This invention relates to an apparatus for the mass scale production of articles from dissolved plastic substances by immersion, and has for its object to provide an apparatus of this kind which enables the articles to be produced in a manner free from danger and also permits of recovery of a very large percentage of the solvents.

A further object is to provide an apparatus which is so designed that the complete process of manufacture, which in particular in the production of articles from cellulose derivatives calls for a variously repeated immersion, can be carried out in a complete cycle of operations.

In the production of articles from dissolved plastic substances, and more particularly from cellulose derivatives, solvents are employed which, upon their evaporation, saturate the air within the immersion chamber or the drying chamber to such an extent as to form an explosive mixture.

It is an object of our invention to minimize the dangers of explosion, to remove the solvents from the atmosphere and to recover them for future use as completely and as cheaply as possible.

Solvents may be removed from the atmosphere of a dipping machine, for example, in either one of two known ways; the first being to provide in the machine cooling coils which condense the solvent and allow it to be removed as a liquid; the second being to withdraw the atmosphere from the machine, preferably continuously, and to pass it through a recovery system, usually of the type in which the solvent is adsorbed by activated carbon.

The use of the second process above mentioned is very expensive where large quantities of solvent are contained in the atmosphere to be purified; on the other hand, while the method first above described is simple and cheap, it only partially removes the solvent, and will normally leave an explosive mixture in the machine to which it is applied, so that opening this machine, as to insert or remove the moulds, permits the escape of vapour involving the loss of solvent and contamination of the atmosphere of the factory, and sometimes resulting in disastrous explosions.

We are able to obtain the benefits of both of these methods and at the same time to achieve a rapid and economical recovery of the solvent, and to minimize the danger of explosion and loss of solvent, by dividing the space in which the various operations are performed (for example, the dipping operation, the first drying operation and the second drying operation) into a series of chambers, connected together by doors which are normally maintained closed, and which are opened only for the passage of the moulds from one chamber to the other. This separation of the immersion operation from the drying operation, and the division of the drying operation into at least two stages, in addition to accomplishing the economy and safety features above referred to also results in improved quality of the final product.

Considering first the first drying chamber, it will be seen that that is the chamber in which the highest concentration of the volatile solvent occurs, for in that chamber great quantities of the solvent come off from the formed articles as they dry. On the other hand, in the dipping chamber the concentration of the solvent is much lower, particularly because, in accordance with the invention of Bratring application Ser. No. 234,620, filed October 12, 1938, we arrange that the atmosphere in the dipping chamber shall be relatively cool and therefore incapable of sustaining large quantities of vapour. In the second drying chamber a relatively small amount of solvent comes off, so that the concentration of solvent in the atmosphere of that chamber is low. The concentration may be lower still in additional chambers, as, for example, in the charging chamber which we illustrate below.

In any chamber having a high concentration of the solvent, and particularly in the first drying chamber, we recover the solvent by condensing it and withdrawing it as a liquid. We do not allow this chamber to communicate at any time with the air outside of the apparatus; we see to it that it only opens to other chambers which are maintained at lower concentrations of the solvent.

In these other chambers, the chambers of lower concentration, we use the method of solvent recovery which consists in abstracting the atmosphere, as by pumping it out continuously by a fan, and passing it through a recovery system. The result is that in these chambers not only is the concentration of the solvent low, with consequent economy of operation of the recovery system, but the pressure is also low, so that there is no tendency for the atmosphere in these chambers to pass by leakage or through temporarily opened doors into the atmosphere of the factory.

In this manner the whole operation, including the recovery of the solvents, can be continuous; the solvent can be recovered with very little loss and the danger of fire and explosion is very much reduced, for no chamber in which the concentration of the solvent is high enough to form an explosive mixture is ever allowed to be opened to the air.

In carrying out our invention in practice on a large scale we provide a series of chambers, each being connected to the next by an opening which is normally closed by a door, and we provide an endless belt which carries the moulds through the various chambers in succession.

Normally we begin with the charging chamber, in which the moulds are introduced. From this charging chamber the moulds pass on the endless belt into a dipping chamber, through doors which open automatically to permit of such passage and close to maintain the desired separation between the chambers. In this chamber, in which the concentration of solvent is not high, the moulds are immersed in the dipping solution.

From this dipping chamber the moulds with the dipped articles upon them pass into the first drying chamber. It is in this chamber that the highest vapour concentration exists and that the danger of explosions would be greatest if it communicated directly with the outer air. In this chamber we provide cooling coils for separating out the solvent. The drying of the moulds and the condensation of the vapours are assisted by the provision in this chamber of an arrangement of heating and cooling coils and baffles which promote a circulation of air around the moulds and cooling coils.

Then, still on the belt and still through automatically opening and closing doors, the moulds are carried to a second drying chamber. In this chamber the concentration of the solvent is relatively low. The solvent is recovered from this chamber and from all other chambers in which its concentration is low by pumping the atmosphere out of these chambers and through an adsorption device. This serves to keep the pressure in those chambers low, as stated above.

The series of three chambers, dipping, first drying and second drying, is repeated as many times as it may be desired to dip the moulds, which will depend on the thickness the finished article should have. For articles such as inexpensive containers to be used as display packages, three times is usually sufficient, and accordingly the apparatus shown in the drawings comprises ten chambers, i. e., three dipping, three first drying, three second drying chambers and a charging chamber. The ten-chamber apparatus is conveniently arranged in two stories of five chambers each. This arrangement affords the further advantage that the third dipping chamber may be located immediately above the second, and a single bath-lifting device may do double duty and serve to lift the dipping baths of both.

In addition to the complete freedom from danger and the high percentage of the solvent recovered a further advantage arising from division of the total production space into single chambers consists in the fact that the single operations can now be carried out at different temperatures.

An application of Kurt Bratring, Ser. No. 218,327, filed July 9, 1938, discloses a method and means of avoiding the formation of bubbles in finished dipped articles, involving a relationship between the temperature of the dipping bath and the temperature of the air into which the dipped molds are withdrawn such that the air is cooler than the bath by something like 10 or 15° C. After remaining for some time in the atmosphere above the dipping bath, the molds carrying the dipped articles are placed in drying chambers in which they are subjected to higher temperatures. We do not herein claim this invention of the said Kurt Bratring; it is claimed in his application above referred to. We note, however, that by a division of the apparatus into a plurality of chambers as we have described it is possible to carry out the procedure of the above mentioned Bratring application in a rapid, economical manner.

The invention is illustrated by way of example in the accompanying drawings, which shows an embodiment of the apparatus in which provision is made for a threefold immersion.

Figure 1:
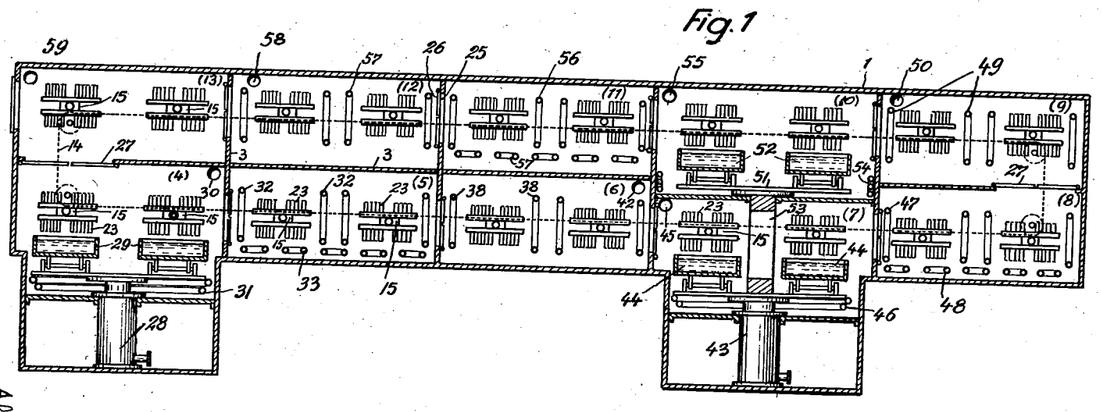
Fig. 1 is a diagrammatical longitudinal section through the apparatus showing a moving belt traversing three immersion chambers, three preliminary drying chambers, three final drying chambers and one charging chamber.

Referring now to the figures, a two-storied casing 1 having gastight and heat-insulated walls 2 and partitions 3 is divided by the latter into ten chambers 4 to 13, of which the first five are on the lower story and the last five on the upper story. An endless belt 14 passes through all ten chambers, and on this belt are mounted twenty supports 15 arranged in groups of two over a length corresponding to the length of a chamber. Each of these supports is rotatable about a shaft. These supports carry on their shafts running wheels 16 (Figs. 2 and 3), which are freely rotatable on the shafts and move along rails 17 extending through the two stories of the apparatus. The shaft 18 of each support 15 is rigidly connected to the latter and extends beyond the wheel 16. At the free ends the shafts 18 carry friction wheels 19, which engage with operating means in a manner which will be described later. On either side of the support 15 between the latter and the wheel 16 the shaft 18 is gripped in freely rotatable fashion by grippers 20 on the endless belt—in this case a double chain 21. Each support 15 is furnished with slideways 22, into which there are introduced in opposite disposal to one another two mould frames having moulds or cores 23. At each end each support 15 is furnished with four guide rolls 24.

In the train of the endless belt or its equivalent, such as the chain 21, there are provided in the partitions between the single chambers on a level with and allowing for the width of the rotary supports 15, including their sets of moulds 23, openings 25, which are closed by two-part doors 26. These doors 26 are adapted to open mechanically during the advance of the moving belt and again to close when the movement of the belt ceases, or in other words immediately after the last support has passed through the same.

The opening and closing of the doors can be brought about in any convenient manner, for example by means of properly placed stops or pins on the moving belt or by coupling the doors with the starting means for the advancing movement.

At the ends of the two-storied casing openings are also provided in the horizontal partition in the path of movement of the belt, these openings being furnished with mechanically actuated doors 27, arranged to be opened and closed in a similar fashion.

On the lower story of the two-storied casing 1 there is provided at one end (chamber 4) the first immersion chamber, furnished with a lifting means which may be a hydraulic plunger 28. This hydraulic plunger acts on two immersion baths 29 (which can be moved into and out of the chamber) to lift them for immersion of the moulds or cores 23 in the plastic solution contained in the baths and to lower them after the immersion has taken place. The chamber 4 is furnished with an outlet 30 communicating with a suction blower. In this way the air in the chamber is sucked up and conducted to adsorption means of any desired kind, such as adsorbers of the activated carbon type. At the bottom of the chamber 4 are provided cooling coils 31 serving to cool the air in the chamber, this air in the chamber 4 preferably being maintained at a temperature which is below the temperature of the liquid in the two baths 29.

Following the immersion chamber 4 in the path of the moving belt there is the preliminary drying chamber 5 having heating elements 32, which raise the chamber to the requisite temperature for preliminary drying of the articles on the moulds 23.

As opposed to these heating elements serving to heat the air in the chamber there are provided at the bottom of the chamber cooling elements 33, which not only assist in promoting a continuous circulation of the air caused to ascend as a result of the heating elements 32, but also condense solvent vapours on their surfaces and thus bring about at the lowest point of the chamber a precipitation of the solvent evaporating during the drying of the articles.

Figure 3:
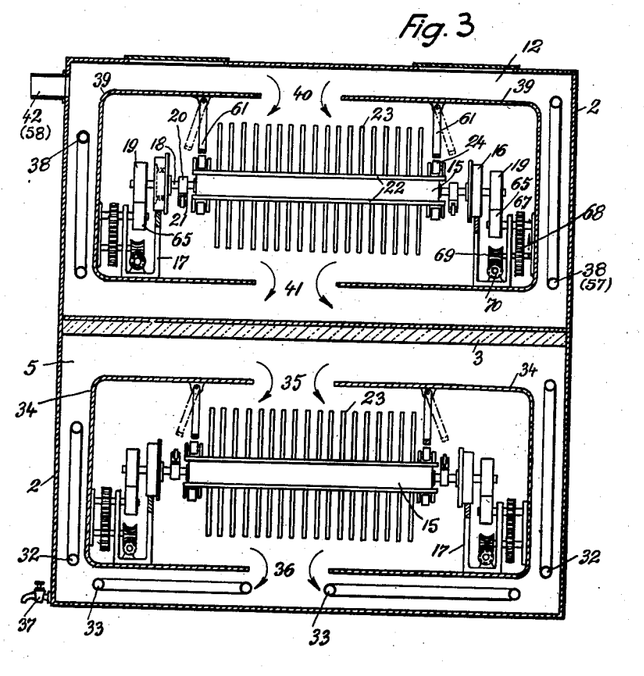
Fig. 3 is a diagrammatical elevation on the line III—III in Fig. 2.

As shown in Fig. 3, there can be provided for creating a directed circulation of the air throughout the chamber 5 auxiliary U-shaped walls 34, which surround the path of movement of the conveying means within the chamber, but leave along the centre of the chamber at the top and the bottom slot-like openings 35, 36, by means of which the air within the said path of movement intercommunicates with the air within the remainder of the chamber. The heating elements 32 are provided on either side in the vertical space between the wall 2 of the chamber 5 and the U-shaped wall 34, whilst the cooling elements 33 are located in the horizontal space between the bottom of the chamber and the wall 34. In this way an ascending current of heated air is produced in the vertical space on either side, this air then entering the central compartment containing the conveying means through the upper opening 35 and enveloping the articles on the moulds 23 in a continuous flow.

The dried and warmed air picks up the solvent evaporating from the articles, becomes cool, again sinks to the bottom whilst washing all articles on the moulds 23 on the support 15, and finally passes through the opening 36 between the U-shaped walls 34 into the horizontal compartment containing the cooling elements 33.

The cooling elements 33 cool the air below normal, so that the solvent vapour carried by the air is caused to be precipitated. This precipitated solvent, which collects along the bottom of the chamber 5, can be withdrawn by means of the tap 37.

Following on the preliminary drying chamber 5 in the path of the moving belt is the final drying chamber 6 which, as indicated in the top portion of Fig. 3 which shows the similar final drying chamber 12, is furnished with heating elements 38 but no cooling elements. To produce a proper circulation of the air the chamber 6 is likewise furnished with two U-shaped walls 39 surrounding the path of movement of the conveying means. As in the chamber 5, slot-like openings 40, 41 are allowed to remain between the walls 39 at the top and the bottom for passage of the air. The heating elements 38 are provided in the vertical space between the wall 2 of the chamber 6 and the U-shaped walls 39, so that under the thermal action the air is caused to ascend on either side of the chamber and then passes through the slot-like opening 40 into the inner compartment enclosing the conveying means, where it washes the articles on the moulds and, being cooled, proceeds through the lower opening 41 into the outer compartment, being distributed equally on either side.

At a suitable point, which in certain circumstances may be coincident with the bottom of the chamber, there is provided an outlet 42 through which, as in the case of the immersion chamber, the air of the chamber is conducted by way of a suction blower to an adsorption system.

The next chamber 7 in the path of the conveyor belt is the second immersion chamber, which in the same manner as the chamber 4 is equipped with a lifting and lowering means 43 for two immersion baths 44, upon the lifting of which the moulds 23 advanced on the supports 15 are again immersed in the plastic solution. The chamber 7 is furnished with an outlet 45 for conducting the air of the chamber by way of a suction fan or pump to the adsorption system, and it is provided with a cooling system 46 similar to that already described in connection with chamber 4 for cooling the chamber to a temperature below that of the liquid solvent in the baths.

The final chamber on the lower story following on the second immersion chamber 7, is a preliminary drying chamber 8, which in similar fashion to the chamber 5 is furnished with heating elements 47 for the purpose of heating the air and causing the air to circulate, and with cooling elements 48 for assisting the circulation of the air and also for condensing the solvent vapour inside the chamber. U-shaped walls as already described in connection with the chamber 5 and as shown in Fig. 3 are likewise provided in the chamber 8.

From the chamber 8 the conveyor belt passes to the upper story of the apparatus, the first chamber of which following on the chamber 8 is the final drying chamber 9. As in the case of the final drying chamber 6 the chamber 9 is furnished with air-heating and circulating elements 49, and is preferably furnished with an outlet 50 for connection to the adsorption system.

The next chamber 10 is the third immersion chamber and is situated immediately above the second immersion chamber 7. The arrangement may be such that by suitable design of the chamber 10 the support 51 for the baths 52 in the chamber 10 can be lifted simultaneously by the lifting means 43 of the immersion chamber 7. If the lifting means for the two chambers are coupled together in this fashion as shown in Fig. 1, sufficient space must be allowed in the supporting structure 53 for the upper chamber to permit of the passage of the mould support 15 with the moulds 23 during the advance of the conveyor belt. This supporting structure, therefore, will preferably be in the form of an arch, although it is also possible to provide suitable connection between the bath support 51 and separate lifting means located at the bottom of the apparatus without departing from the general idea according to the invention. The chamber 10 is furnished with cooling means 54, and it may also have an outlet 55 as described in connection with the first and second immersion chambers.

The third chamber in the path of the belt on the upper story of the apparatus is a preliminary drying chamber 11 equipped with heating elements 56 and cooling elements 57 as already described in connection with the chamber 5. In this chamber, therefore, provision is likewise made for circulation of the air and immediate condensation of the solvent vapour.

The chamber 11 is followed by a third final drying chamber 12 which, as shown in Fig. 3, is furnished with heating elements 57 and an outlet 58, as already described in connection with the first final drying chamber 6.

The last chamber on the upper story is the chamber 13, which serves as charging chamber for the conveying belt and is furnished with an outlet 59 for connection to an adsorption system both to conserve the vapours which enter from the adjoining chambers and would escape when the chamber 13 is opened for insertion and removal of moulds, and also to maintain a slightly reduced pressure in this chamber to prevent any tendency on the part of these vapours to mingle with the outside air and form explosive mixtures.

For the charging and unloading of the supports 15 there are provided (see Fig. 2) in the front and rear longitudinal walls of the chamber 13 apertures 60, which are capable of being closed down and through which the moulds 23 are introduced preferably from the front of the apparatus, whilst the moulds bearing the moulded articles already completed are removed from the supports 15 at the rear. The width of the apertures is preferably such that both supports 15 which happen to be in the charging chamber can be charged or unloaded simultaneously.

As already described, the supports 15 passing with the endless belt through all chambers of the two-storied casing 1 are furnished with freely rotatable running wheels 16 (Figs. 2 and 3) running on rails 17 which extend through both stories of the apparatus. The endless belt is constituted by a double chain 21, which on either side of the supports 15 grips the ends of the shafts of the supports in freely rotatable fashion between the supports and the wheels 16 by means of grippers 20.

At the two ends the supports 15 possess guide rolls 24, which serve when necessary to guide the supports into a desired position, these supports 15 otherwise being freely rotatable about the shafts 18 as axes of rotation.

At the points at which the double chain 21 conveys the supports 15 from the one story to the other, and at which there are also located the points of reversal of the conveying chain or belt, the grippers 20 maintain the wheels 16 in close contact with the rails 17, which latter likewise extend through the two stories and from the one to the other in the path of the chain or belt. To permit of proper guiding of the supports 15 at the points in question the guide rolls 24 are caused to bear against guard rails 61 and 62 in the manner described in the following:

At the horizontal end of the rail 17 on the upper story there is provided in suitable spacial disposal a horizontal guard rail 61, which upon the final advance of the supports 15 in the horizontal direction ensures their horizontal position by way of the guide rolls 24 until the chain 21 is deflected from the horizontal direction. Slightly in front of this point, however, the front guide rolls 24 have been engaged by the guard rails 62. These guard rails are so formed that upon the deflection of the chain 21 and accordingly upon the change over of the wheels 16 from the horizontal to the vertical direction they guide the supports 15 by way of the guide rolls 24 in such a manner that the supports 15 are held in a horizontal position. This position is illustrated in dash-dotted lines in Fig. 2.

At the lower point of deflection the wheels 16 leave the vertical section of the rail 17 and, guided by the grippers 20 on the shaft, pass on to the rail 17 on the lower story. The guard rail 62 for the guide rolls 24 extends for a short distance in the horizontal direction in the lower story, at the same time a further guard rail 63 taking over the guiding of the lower rolls 24 until the support 15 has reached the operative position on the lower story of the apparatus.

Figure 2:
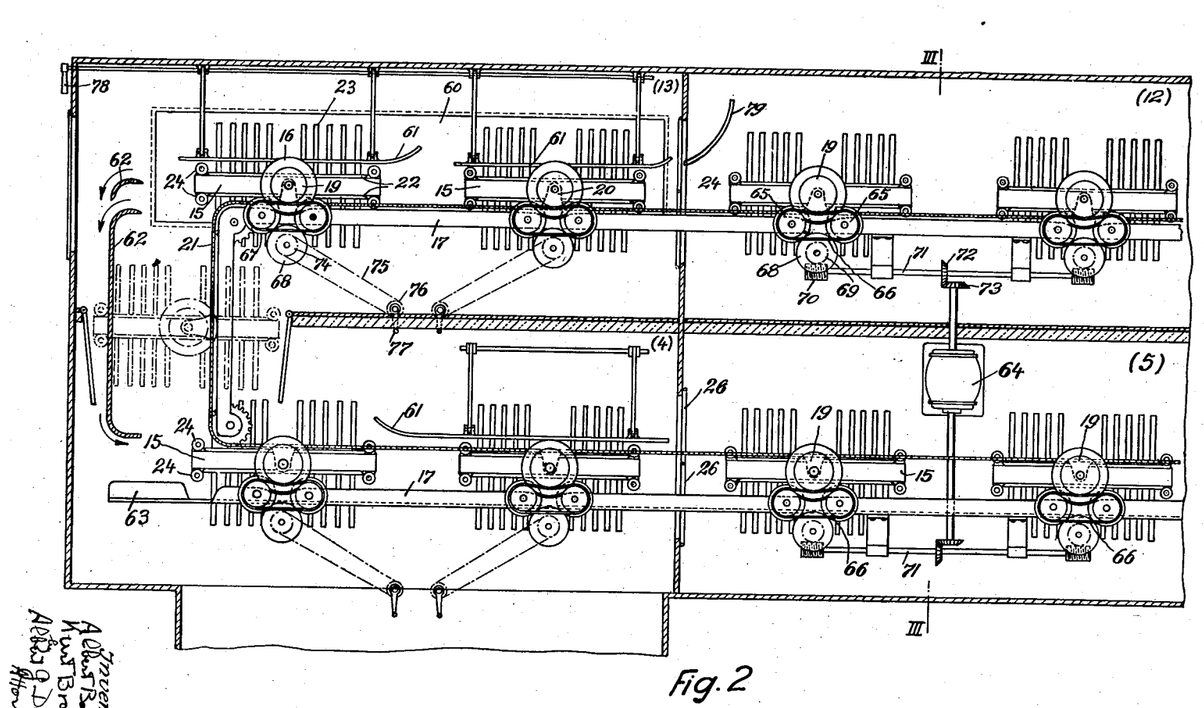
Fig. 2 is a longitudinal section showing a part of the same apparatus on an enlarged scale, and showing in addition the arrangement for movement of the mould supports in the drying chambers.

The two chains 21 are driven intermittently by driving means of the conventional kind, the drive being such that upon each advancing movement the chains 21 with the supports 15 are advanced by the length of a chamber. In this way two supports 15 bearing the moulds 23 are moved into or out of a chamber upon each advance. At the positions assumed by the supports 15 during the stationary periods of the chains 21 there are provided actuating means which enable the supports 15 to be rotated about their axes. In this connection the arrangement is such that in the drying chambers 5, 6, 8, 9, 11 and 12 the supports 15 are rotated continuously during the stationary periods by a separate drive 64, whilst in the immersion chambers 4, 7 and 10 and in the charging chamber 13 means are provided which permit of a rotation of the supports 15 as desired during the stationary periods of the chain or belt. To permit of this rotation of the supports 15 the arrangement, in accordance with Figs. 2 and 3, is as follows:

At each of the points at which the supports 15 are located during the stationary condition of the chain or belt there is provided an endless belt 66 passed about rolls 65 and entering into frictional engagement with the friction wheels 19 keyed onto the ends of the shafts of the supports 15. Movement of the endless belt 66 accordingly results in rotation of the support 15 about its shaft. The rolls 65, by means of spur wheels 67 and 68, are in operative engagement with a worm wheel 69, this worm wheel 69 being driven by a worm 70, which is mounted on a horizontal shaft 71 extending through the drying chambers. The shaft 71 is continuously driven by way of bevel wheels 72, 73 by a driving source, such as an electric motor 64, this driving source driving the worm wheel shaft 71 on the upper story as well as the corresponding shaft 71 on the lower story.

In the immersion chambers 4, 7 and 10 and in the charging chamber 13 there is provided a similar arrangement of moving belt 66 at the stationary positions of the supports 15. This belt 66 in engagement with the driving wheels 19 is also driven by similar spur wheels 67, 68. On the shaft of the central spur wheel 68 there is provided, however, at these points a sprocket wheel 74, which by means of a chain 75 is in driving engagement with a sprocket wheel 76, which latter can be rotated by a handle 77 extending to the exterior of the casing.

To permit of a gentle application of this rotary drive to the supports 15 during the stationary periods of the chains 21 the following arrangement is provided:

The wheels 16 moving on the rails 17 have such a diameter with relation to the wheel 19 that the oncoming support 15 readily passes with the wheel 19 over the endless belt 66. At the stationary position, however, the rail 17 is slightly recessed, so that at this point the support 15 with the wheels 19 is lowered and the wheels 19 are thus moved into close contact with the endless belt. In this way the shaft of the support 15 is firmly coupled with and driven by the central wheel 68. Upon the advance of the chains the support 15 is lifted with its wheel 16 out of the recess in the rail 17, so that the wheel 19 is also lifted gently from the endless belt and the operative engagement with the latter is interrupted.

As already described, it is desirable for conveying the supports 15 from one story to another to provide at the end of the upper or the lower story a horizontal guide, which remains in engagement with the guide rolls 24 until such time as the guide rolls have been engaged and taken over by the vertical guard rails 62. At the same time it is necessary to hold the supports 15 rigidly in the horizontal position in the charging chamber when mould frames bearing the moulds 23 are to be applied to the top of the support 15. On the other hand this retention in the horizontal position should be interrupted immediately it is desired to rotate the supports 15 in the charging and immersion chambers by means of the handle 77.

To permit of this there are provided in the stationary positions of the supports 15 in the charging chamber 13 and the immersion chambers 4, 7 and 10, above the path of movement of the supports 15, guard rails 61 which, however, are pivotally suspended from the top of the chamber and can be rocked laterally by suitable operating means 78, for example by a rocking lever provided on the outside of the charging chamber. In the laterally rocked position, indicated by dotted lines in Fig. 3, the guard rails 61 move out of engagement with the guide rolls 24 of the support 15. The support 15 now can be freely rotated about its axis by means of the wheel 19. In Fig. 2 this rail in the immersion chamber on the left has been omitted in order not to interfere with the remainder of the illustration.

In the drying chambers a retention of the supports in the manner described is not required; it is, however, necessary to provide at the passages through the doors intercepting means 79, which strike against the guide rolls 24 upon the passage of a support through the door and compel the support to assume a horizontal position, so that the door does not require to be dimensioned in accordance with the largest diameter of the otherwise freely rotating support, but only in accordance with the cross-sectional area of the support. In this way the areas which require to be sealed by the door are kept as small as possible.

A similar intercepting device 79 is also provided shortly before the point at which the conveying belt or chain passes from the preliminary drying chamber 8 on the lower story to the final drying chamber 9 on the upper story, in order also in this case, as between the charging chamber 13 and the immersion chamber 4, to bring about engagement between a horizontal guide 62 and the guide rolls 24.

The operation of the apparatus is as follows:

In the charging chamber 13 the two supports 15 rigidly held in the horizontal position by the guard rails 61 are loaded on the one side with mould frames, whereupon the rail 61 is rocked by the lever 78. By means of the handles 77 the supports 15 are rotated through 180°, whereupon by actuation of the lever 78 the guard rails 61 are again moved into engagement with the guide rolls 24, and in this rigid position mould frames bearing the moulds 23 are also applied to the opposite sides of the supports 15.

Upon the advance of the moving belt or chains the supports 15 thus loaded are carried into the first immersion chamber on the lower story. When the movement of the belt or chains has ceased the immersion baths 29 are lifted to the desired height by the lifting means 28 so as to cause the downwardly directed moulds on the supports to be immersed in the plastic solution, and the baths are then again lowered. After the lowering the guard rails 61 are rocked away, and the supports 15 are rotated through 180° by hand, so that the moulds previously immersed are now reversed in position. To secure this position the rail 61 is rocked back against the guide rolls 24, whereupon the immersion baths 29 are again lifted for immersion of the second batch of moulds. After the immersion of this second batch in the plastic substance and the lowering of the baths the guard rails 61 are again rocked away and the supports 15 are rotated for a second time through 180°, so that the moulds which were the last to be immersed are again directed upwards, in which position the film of still moist plastic substance on the moulds is somewhat equalized in thickness by running in the opposite direction. This position is likewise secured by renewed engagement of the guard rails 61.

Upon the next advance movement of the chains 21 the freshly immersed moulds 23 on the two supports 15 pass through the doors 26, which are caused to open upon the advance, into the first preliminary drying chamber 5. When the supports 15 move in this chamber on to the endless belts 66 and their wheels 19 have been caused to engage they commence to rotate continuously, and it is only when the chains 21 are again advanced that this rotation ceases.

The supports 15 may commence their movement in any random angular position, and are intercepted and moved into the horizontal position before entering the next chamber door by a guard rail 79 similar to that shown in Fig. 2 with respect to the chamber 12.

The cores or moulds 23, which have been subjected to the preliminary drying action whilst at the same time being continuously rotated, now pass into the final drying chamber 6, in which, with the conveying chains in the stationary condition, the supports 15 are again continuously rotated about their shafts.

The moulds 23 on which the first layer produced by immersion has now been dried pass with the supports 15 through the next chamber door 26 into the second immersion chamber 7, in which they are subjected to a second immersion, followed by preliminary drying under continuous rotation in the preliminary drying chamber 8 and a final drying, likewise with continuous rotation, in the final drying chamber 9.

After this second final drying the moulds 23 carrying thereon two layers of plastic substance are moved by the further advance of the supports 15 through the next chamber door into the third immersion chamber 10, in which the same operations occurs as in the chambers 4 and 7, viz., immersion in the baths, rocking of the guard rails, reversal of the moulds, re-engagement of the guard rails and immersion of the second batch of moulds.

Following on the third immersion the moulds are conducted to the third preliminary drying chamber, where they are continuously rotated, and finally into the last chamber but one, i. e., the third final drying chamber 12, where likewise they are continuously rotated.

The moulds or cores 23 bearing three layers of plastic substance now pass on the supports 15, as the chains 21 again advance, into the charging chamber 13, and with the supports locked in the horizontal position the moulds are first removed from the one side, fresh moulds being fitted in their stead. After the guard rails 61 have been rocked away the two supports 15 are rotated through 180° by means of the handles 77. Thereupon after re-engagement of the guard rails 61 the moulds having the moulded articles thereon are also removed from the opposite side and replaced by fresh moulds. The removal of the dipped moulds is preferably performed solely through the aperture on the one side of the charging chamber, whilst the introduction of the fresh moulds takes place in continuous operation through a similar aperture 60 on the opposite side of the charging chamber.

In the above there has been described the passage of two supports 15 through the complete apparatus. In practice, of course, these are followed by other supports, two in each chamber, which are all charged, immersed, dried and discharged in similar fashion.

Figure 4:
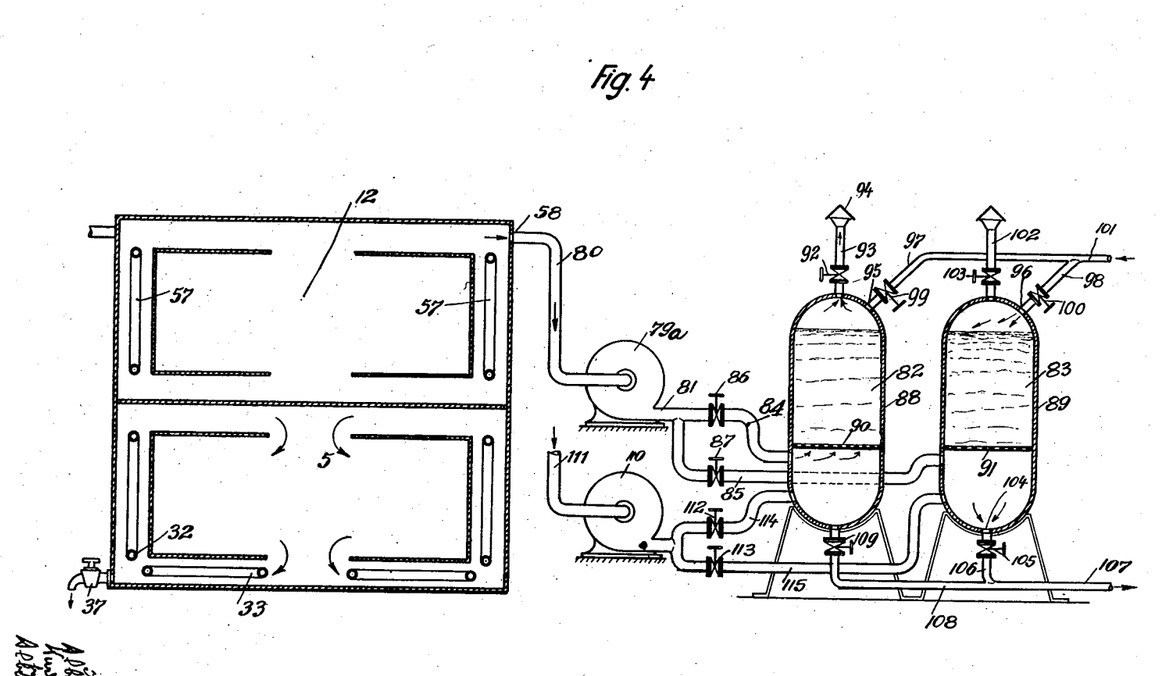
Fig. 4 is a diagrammatical view showing a chamber connected to a suction blower communicating with an adsorption device.

In Fig. 4 there is shown the manner in which, dependent on the desired nature of the recovery, the circulation of the air takes place in the single chambers.

Whereas in the preliminary drying chamber 5 (see Fig. 3) the air in the space between the two walls is caused to ascend under the action of the heating elements 32 and thereupon passes through the upper opening 35 into the inner compartment, from where it proceeds in thermal flow through the lower opening 36 to the bottom of the chamber for condensation of the solvent vapour against the cooling elements 33; the air in the main drying chamber 12 situated above the chamber 5 is sucked up by a suction blower 79ᵃ.

To the outlet 58 of the drying chamber 12 there is connected a pipe 80, which conducts the air from this chamber to the suction blower 79ᵃ. The suction blower forces the air through the pipes 81, 84 and 85 to the adsorbers 82, 83. Behind the point where the pipe 81 is divided to form the pipes 84, 85 there are provided valves 86, 87, which enable the air to be conducted selectively to the one adsorber (82) or the other (83).

The adsorbers 82, 83 consist of vertical containers having insulated jackets 88, 89. In the upper portion of each of these adsorbers there is provided a grate 90, or 91, on which there is piled active carbon, which has the property of adsorbing on its surface any vapours contained in the surrounding air, i. e., in the present case the solvent vapours.

When one of the adsorbers is connected up for adsorption the suction blower 79ᵃ, as indicated in Fig. 4, forces the air from the chamber through the open valve 86 and the pipe 84 into the adsorber below the grate 90. All remaining outlets of the adsorber are closed, so that under this pressure the air and vapours are forced through the carbon. It is only at the top of the adsorber that there is an open valve 92, which allows the air cleaned by the carbon to pass through the outlet 93 and the head 94 into the atmosphere.

At the top of each of the adsorbers 82, 83 there is also provided an inlet 95 or 96, to which are connected pipes 97, 98 controlled by valves 99, 100. These pipes 97, 98 are connected to a steam pipe 101, by means of which, when the valves 99, 100 are opened, steam can be introduced into the top of the adsorbers.

As shown in Fig. 4, the adsorber 83, when disconnected from the apparatus chambers by the valve 87, is connected for washing of the carbon. For this purpose the steam valve 100 is opened, and the outlet 102 at the top of the adsorber 83 is closed by the valve 103. The steam entering under pressure at the top of the adsorber at 96 is distributed over the entire surface of the carbon and is forced through the latter. Upon its passage through the carbon in counterflow to the adsorption phase the steam removes the solvent which has been adsorbed by the carbon. This mixture of solvent and steam accumulates below the grate 91, and at the bottom of the adsorber 83 it can be conducted to a main collecting pipe 107 by way of the outlet 104, open valve 105 and pipe 106.

Whilst the lower outlet valve 105 of the adsorber 83 is open during the washing phase the outlet valve 109 of the adsorber 82 connected in parallel by way of the pipe 108 is naturally closed.

The air from the chambers connected to the adsorption system, for example in Fig. 4 the air from the chamber 12, is conducted selectively by the blower 79ᵃ to the one adsorber or the other almost up to the complete adsorption capacity, whilst the second adsorber is in the washing phase. This is carried out alternately.

At the same time it is necessary during the operation to interpose as a third phase a cleaning phase in which, by means of a suction blower 110 fresh air is sucked up by way of the intake pipe 111, and by way of the valves 112, 113 and associated pipes 114, 115 injected selectively into the adsorber 82 or 83 below the active carbon, being discharged into the atmosphere above the active carbon after the opening of the upper outlet valve 92 or 103.

It will be clear that the outlets 30, 42, 45, 50, 55, 58 and 59 of the different chambers of the immersion apparatus can either be connected in common to a double-adsorption system as in Fig. 4, or that each of the chambers 4, 6, 7, 9, 10, 12 and 13 may have a separate adsorption system, these systems then being connected for alternate operation. Further, it is also possible to provide other solvent-recovery means behind the suction blowers 79ᵃ. Quite generally it will be understood that no limitation is made to the specific embodiment illustrated in the drawings, and that numerous modifications are quite possible within the meaning of the above description and the annexed claims without departing from the spirit of the invention.

What we claim as new and desire to secure by Letters Patent is:

1. In an apparatus for forming articles by dipping molds in a solution containing a volatile constituent capable of forming with air an explosive mixture, a plurality of chambers in which different operations are performed and in the atmosphere of which concentration of the volatile constituents is normally different, the chamber having the highest concentration of the volatile substance opening only into a chamber having a lower concentration, and not directly to the air.

2. In an apparatus for forming articles by dipping molds in a solution containing a volatile constituent capable of forming with air an explosive mixture, a dipping chamber, a primary drying chamber connected to said dipping chamber and a secondary drying chamber connected to said primary drying chamber, each of said chambers being separated from its adjoining chamber by a displaceable closure means one of said chambers normally containing vapours of said constituent in a concentration such that if mixed with air the resulting mixture would be explosive, means for condensing said vapours in said chamber, means for avoiding direct communication between said last mentioned chamber and air outside of the apparatus, and means for withdrawing the atmosphere from another of said chambers and for removing said volatile constituent therefrom.

3. In an apparatus for producing articles by dipping moulds in a solution containing a volatile constituent, a plurality of chambers in which different successive operations are performed, means for conveying said moulds successively through said chambers, at least one of said chambers opening to the outside of the apparatus and at least one other opening only to another of said chambers, and means for maintaining a negative pressure within such of said chambers as open to the outside of the apparatus.

4. In an apparatus for producing articles by dipping moulds in a solution containing a volatile constituent, a plurality of chambers in which different operations are performed, at least one of said chambers opening to the outside of the apparatus and at least one other opening only to another chamber, means for condensing vapours of the volatile constituent in a chamber opening only to another chamber, and means for sucking the atmosphere from a chamber which opens to the outside of the apparatus.

5. In an apparatus for producing articles by dipping moulds in a solution containing a volatile constituent, a plurality of chambers in which different operations are performed and in the atmosphere of which the concentrations of the volatile constituent are normally different, a chamber in which the concentration is high opening into a chamber in which the concentration is low and not to the outside of the apparatus, means for condensing vapours of the volatile constituent in a chamber in which the concentration of the volatile constituent is high, and means for sucking atmosphere from a chamber in which the said concentration is low.

6. In an apparatus for producing articles by dipping moulds in a solution containing a volatile constituent, a plurality of separate chambers in which different operations are performed and in the atmosphere of which the concentrations of the volatile constituent are normally different, the chamber in which the concentration is high opening into the chamber in which the concentration is low, and not to the outside of the apparatus, means for condensing vapours of the volatile constituent in a chamber in which the concentration of the volatile constituent is high, means for sucking atmosphere from a chamber in which the said concentration is low and for maintaining a negative pressure within said chamber, a solvent recovery apparatus, and means for passing said atmosphere to said solvent recovery apparatus.

7. In an apparatus for producing articles by dipping moulds in a solution containing a volatile constituent, a plurality of chambers in which different operations are performed, means for conveying said moulds successively through said chambers, at least one of said chambers opening to the outside of the apparatus and at least one other of said chambers opening only to another of said chambers, means for condensing vapours of the volatile constituent in a chamber opening only to another of said chambers, means for withdrawing the atmosphere from that chamber which opens to the outside of the apparatus, and means for recovering solvents from the atmosphere withdrawn from said last-named chamber.

ALBERT BOECLER.
KURT BRATRING.